US012215526B2

(12) United States Patent
Zhou et al.

(10) Patent No.: US 12,215,526 B2
(45) Date of Patent: Feb. 4, 2025

(54) SPIDER ELECTRONIC TAG

(71) Applicant: XUZHOU DRAGON GUARD INDUSTRIAL CO., LTD, Xuzhou (CN)

(72) Inventors: Wen Zhou, Xuzhou (CN); Lin Xin, Xuzhou (CN); Bin Zhao, Xuzhou (CN); Shanshan Xu, Xuzhou (CN)

(73) Assignee: XUZHOU DRAGON GUARD INDUSTRIAL CO., LTD, Xuzhou (CN)

( * ) Notice: Subject to any disclaimer, the term of this patent is extended or adjusted under 35 U.S.C. 154(b) by 146 days.

(21) Appl. No.: 18/177,143

(22) Filed: Mar. 2, 2023

(65) Prior Publication Data

US 2024/0141701 A1 May 2, 2024

(30) Foreign Application Priority Data

Oct. 31, 2022 (CN) ......................... 202222876675.5

(51) Int. Cl.
*E05B 73/00* (2006.01)

(52) U.S. Cl.
CPC ................................ *E05B 73/0029* (2013.01)

(58) Field of Classification Search
CPC ............. E05B 73/0005; E05B 73/0011; E05B 73/0017; E05B 73/0029; E05B 67/006
See application file for complete search history.

(56) References Cited

U.S. PATENT DOCUMENTS

| | | | | |
|---|---|---|---|---|
| 7,288,391 | B2 | 10/2007 | Roth et al. | |
| 7,754,851 | B2 | 7/2010 | Scheibel et al. | |
| 8,087,269 | B2 * | 1/2012 | Conti | E05B 45/005 70/57.1 |
| 8,642,734 | B2 | 2/2014 | Johansson et al. | |
| 8,890,689 | B2 * | 11/2014 | Ezzo | G08B 13/1445 340/568.1 |
| 2007/0069529 | A1 * | 3/2007 | Nilsson | G09F 3/0329 292/315 |
| 2008/0034815 | A1 * | 2/2008 | Fawcett | E05B 45/005 70/57.1 |

* cited by examiner

*Primary Examiner* — Matthew Troutman
*Assistant Examiner* — Christopher F Callahan
(74) *Attorney, Agent, or Firm* — True Shepherd LLC; Andrew C. Cheng

(57) ABSTRACT

A novel spider electronic tag includes a take-up device; and a base connected to the take-up device through a retractable steel wire rope. The take-up device includes: a housing; a take-up assembly, mounted in the housing; and a locking fastener, mounted in the housing and configured to lock the take-up assembly; the locking fastener includes: a rotating ratchet member, fixedly arranged at the top of the take-up assembly; and a leaf spring, embedded in an inner circumferential wall of the housing and configured to cooperate with the rotating ratchet member to lock the take-up assembly. The steel wire rope is passed in a listed sequence through the rotating ratchet member, the take-up assembly and the base clockwise from top to bottom, and two ends of the steel wire rope are fixed inside the rotating ratchet member, to connect the take-up device with the base.

5 Claims, 6 Drawing Sheets

SPIDER ELECTRONIC TAG

FIELD

The present application relates to the technical field of electronic tags, and in particular to a novel spider electronic tag.

BACKGROUND

An anti-theft tag, which belongs to electronic article surveillance (EAS) technology, is used to identify an anti-theft soft tag pasted on the commodity or an anti-theft hard tag (reusable) nailed on the clothing, shoes and hats by a detection system placed at an entrance, an exit or a cash register of a supermarket. When a tag that has not been processed by a cashier (the soft tag has not been degaussed or the hard tag has not been removed) passes through the system, the system will issue an alarm to draw the staffs attention.

The spider electronic tag is a kind of anti-theft tag, which is generally used for anti-theft of boxes or irregular commodities. For example, a utility model patent No. CN201521039378.9 discloses an electronic string bag tag which includes a take-up device and a string bag woven by or with a wire, where the string bag has an opening, and a circuit board is arranged inside the take-up device. The electronic string bag tag is characterized in that an end of the wire forms a closing end which is connected to an interior of the take-up device, and the take-up device can retract or release the wire to tighten or open the opening of the string bag. The wire and the circuit on the circuit board form a loop to form an anti-theft alarm circuit. The braided wire of the string bag forms the closing end and only one signal loop is formed between a bag body of the string bag, the closing end and the circuit board, so that an alarm is caused no matter where the wire is cut. This product has a simple structure and an excellent anti-theft performance.

However, a locking structure of the take-up device of the above electronic string bag tag has a complex structure and many parts, and the production thereof is difficult and costly.

Therefore, it is necessary to provide a new technical solution to overcome the above disadvantages.

SUMMARY

An object of the present application is to provide a novel spider electronic tag which can effectively solve the above technical problems.

In order to achieve the object of the present application, the following technical solution is provided:

a novel spider electronic tag includes a take-up device; and a base connected to the take-up device through a retractable steel wire rope; wherein the take-up device includes:

a housing;

a take-up assembly, mounted in the housing; and a locking fastener, mounted in the housing and configured to lock the take-up assembly;

wherein the locking fastener includes:

a rotating ratchet member, fixedly arranged at the top of the take-up assembly; and a leaf spring, embedded in an inner circumferential wall of the housing and configured to cooperate with the rotating ratchet member to lock the take-up assembly;

wherein the steel wire rope is passed in a listed sequence through the rotating ratchet member, the take-up assembly and the base clockwise from top to bottom, and two ends of the steel wire rope are fixed inside the rotating ratchet member, to connect the take-up device with the base.

Preferably, at least one leaf spring is provided.

Preferably, the take-up assembly includes:

a take-up reel, fixed at the bottom of the rotating ratchet member, wherein a mounting groove is defined at the bottom of the take-up reel; and a coil spring, embedded in the mounting groove, wherein the middle of the coil spring is positioned and clamped with a central positioning column at the bottom of the housing, to drive the take-up reel and the rotating ratchet member to rotate synchronously to retract or release the steel wire rope.

Preferably, a coil spring storage box is embedded in the mounting groove, the coil spring is accommodated in the coil spring storage box, and a through hole coaxial with the coil spring is defined at the bottom of the coil spring storage box.

Preferably, the central positioning column is detachably connected with the housing.

Preferably, a rope-passing hole for the steel wire rope to pass through is respectively defined at the bottom of the rotating ratchet member, at the take-up reel, at the coil spring storage box, at the bottom of the housing and at the bottom of the base.

Compared with the conventional technology, the present application has the following beneficial effects:

1. According to the present application, the take-up assembly is locked by the cooperation of the leaf spring and the rotating ratchet member, which has good anti-theft performance; the leaf spring still will not disengage with the rotating ratchet member even in the case of falling or being struck by a foreign object, which can achieve a good anti-striking effect; in addition, the present application has the advantages of simple structure, convenient production and processing, low cost, and easy popularization and application.

2. According to the present application, the steel wire rope can be automatically retracted by providing the coil spring to drive the rotating ratchet member and the take-up reel to rotate, which not only has a simple structure, but also improves the working efficiency of the user.

BRIEF DESCRIPTION OF THE DRAWINGS

In order to illustrate technical solutions in the embodiments of the present application more clearly, the accompanying drawings used in the description of the embodiments are briefly described below.

Figure 1:
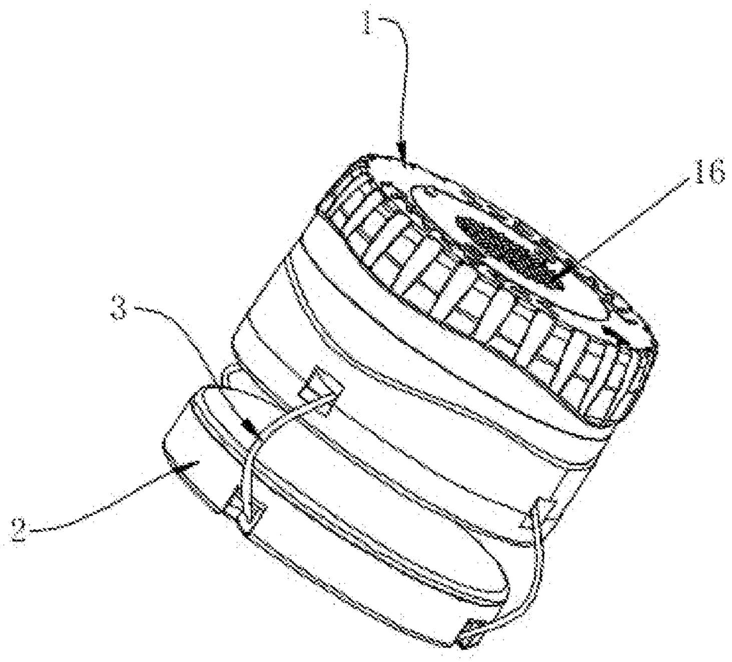
FIG. 1 is a schematic structural view of a novel spider electronic tag according to the present application.

Reference numerals are listed as follows: 1 take-up device; 11 upper housing; 12 lower housing; 13 take-up assembly; 131 take-up reel; 132 coil spring storage box; 133 coil spring; 14 leaf spring; 15 rotating ratchet member; 16 top cover;

2 base; 3 steel wire rope; 4 central positioning column; 5 circuit board; 6 light guide column; 7 buzzer; 8 battery; 9 radio frequency sensor.

DETAILED DESCRIPTION OF THE EMBODIMENTS

In order to make the objects, technical solutions and advantages of the embodiments of the present application clearer, the technical solutions in the embodiments of the present application are described clearly and completely in conjunction with the embodiments of the present application hereinafter. It is apparent that the described embodiments are only some embodiments rather than all embodiments of the present application.

In the description of the present application, it should be appreciated that the orientations or positional relationships indicated by the terms such as "center", "transverse", "longitudinal", "front", "rear", "left", "right", "upper", "lower", "vertical", "horizontal", "top", "bottom", "inside", and "outside", are based on the orientation or positional relationship shown in the drawings, which are only used to facilitate the description of the present application and to simplify the description, rather than to indicate or imply that the devices or elements referred to must have a specific orientation or can only be configured and operated in a particular orientation. Therefore the above-mentioned terms should not be construed as a limitation to the protection scope of the present application. If a component is referred to as being "fixed" to another component, the former component can be directly on the latter component, or there may be an intermediate component existing therebetween. If a component is considered to be "connected" to another component, the former component can be directly connected to the latter component, or there may be an intermediate component existing therebetween. If a component is considered to be "arranged on" another component, the former component may be directly arranged on the latter component, or there may be an intermediate component existing therebetween. The terms, such as "vertical", "horizontal", "left", and "right", and similar expressions used in this specification are for illustrative purposes only.

A novel spider electronic tag according to the present application is described clearly and completely in combination with the accompanying drawings.

As shown in FIG. 1 to FIG. 6, a novel spider electronic tag according to the present application includes a take-up device 1 and a base 2; the take-up device 1 is connected with the base 2 through a retractable steel wire rope 3.

As shown in FIG. 2, FIG. 3, FIG. 5 and FIG. 6, the take-up device 1 includes a housing, and a locking fastener and a take-up assembly 13 which are mounted in the housing.

The housing includes an upper housing 11 and a lower housing 12, a cavity is formed between the upper housing 11 and the lower housing 12, and the two housings are fixedly connected by welding or other fixing methods. A clamping groove is defined on an inner circumferential wall at the top of the upper housing 11; a central positioning column 4 is fixedly provided in the middle of the lower housing 12 for positioning and mounting the take-up assembly 13.

The locking fastener includes a leaf spring 14 and a rotating ratchet member 15; the leaf spring 14 is clamped in the clamping groove, the rotating ratchet member 15 is fixedly mounted at the top of the take-up assembly 13; and the leaf spring 14 is engaged with a ratchet on the rotating ratchet member 15, so as to lock the take-up assembly 13.

During assembly, the steel wire rope 3 is passed in a listed sequence through the rotating ratchet member 15, the take-up assembly 13 and the base 2 clockwise from top to bottom, and two ends of the steel wire rope 3 are fixed inside the rotating ratchet member 15, so as to connect the take-up device 1 with the base 2.

In an initial state, the leaf spring 14 is engaged with the ratchet of the rotating ratchet member 15, the take-up assembly 13 is locked, and the base 2 cannot be pulled.

During usage, first, an unlocking device is used to unlock, and the specific operation is as follows: the unlocking device is buckled on an outer side of the upper housing 11, and the unlocking device attracts the leaf spring 14 to disengage with the rotating ratchet member 15 under the magnetic force, thereby completing the unlocking; after unlocking, the base 2 is pulled, the rotating ratchet member 15 and the take-up assembly 13 rotate counterclockwise under the drive of the steel wire rope 3 to release the steel wire rope, then the article is placed between the base 2 and the take-up device 1, the base 2 is released, and the take-up assembly 13 drives the rotating ratchet member 15 to rotate, automatically retracting the steel wire rope, to lock the article between the base 2 and the take-up device 1; then the unlocking device is removed, and the leaf spring 14 automatically bounces back to engage with the rotating ratchet member 15, thereby completing the locking of the take-up assembly 13. It should be noted that any magnetic unlocking device on the market can be selected as the unlocking device, which pertains to the prior art and will not be described in detail here.

According to the present application, the take-up assembly 13 is locked by the cooperation of the leaf spring 14 and the rotating ratchet member 15, which has good anti-theft performance; the leaf spring 14 still will not disengage with the rotating ratchet member 15 even in the case of falling or being struck by a foreign object, which can achieve a good anti-striking effect; in addition, the present application has the advantages of simple structure, convenient production and processing, low cost, and easy popularization and application.

Figure 6:
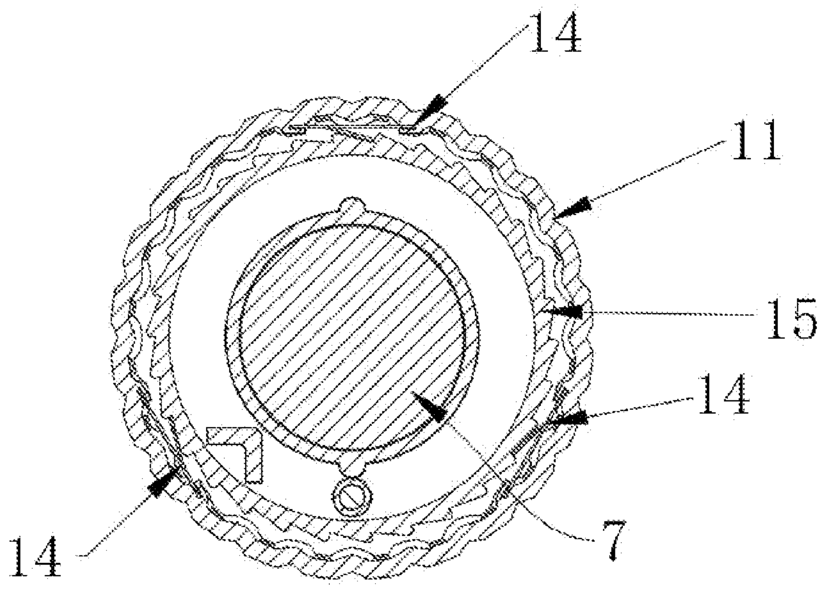
FIG. 6 is a cross-sectional view taken along line B-B in FIG. 5.

Specifically, at least one leaf spring 14 is provided. As shown in FIG. 6, in this embodiment, three leaf springs are provided, which can further improve the stability, anti-theft and anti-striking performance of the electronic tag.

Figure 2:
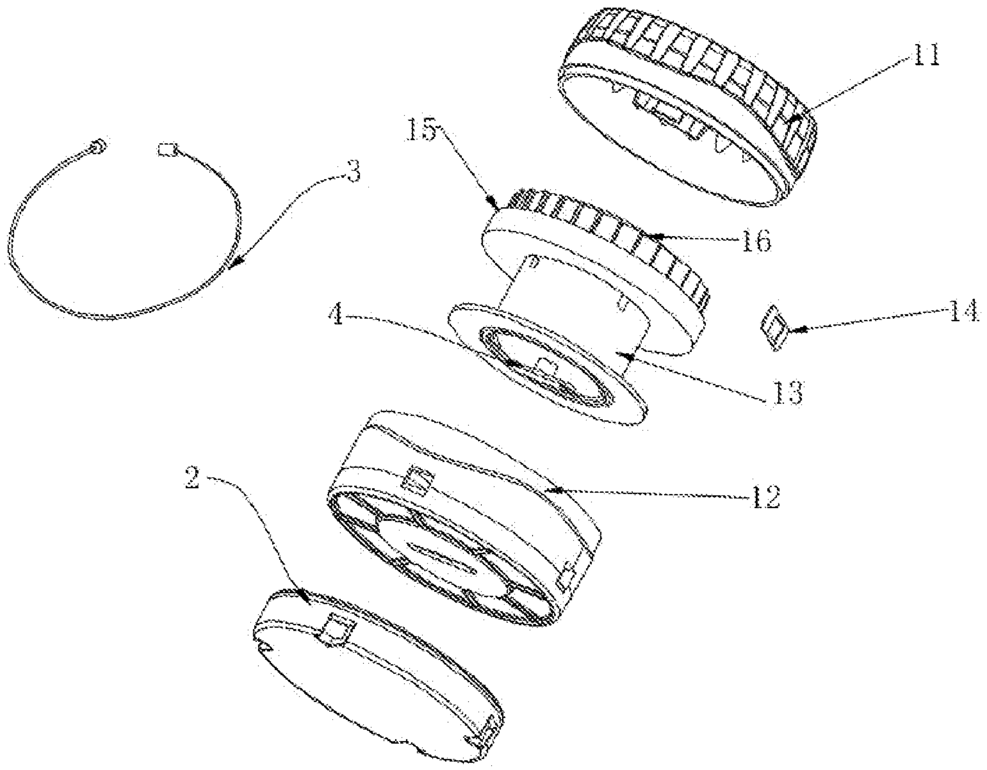
FIG. 2 is a schematic decomposition view of the novel spider electronic tag according to the present application.
Figure 3:
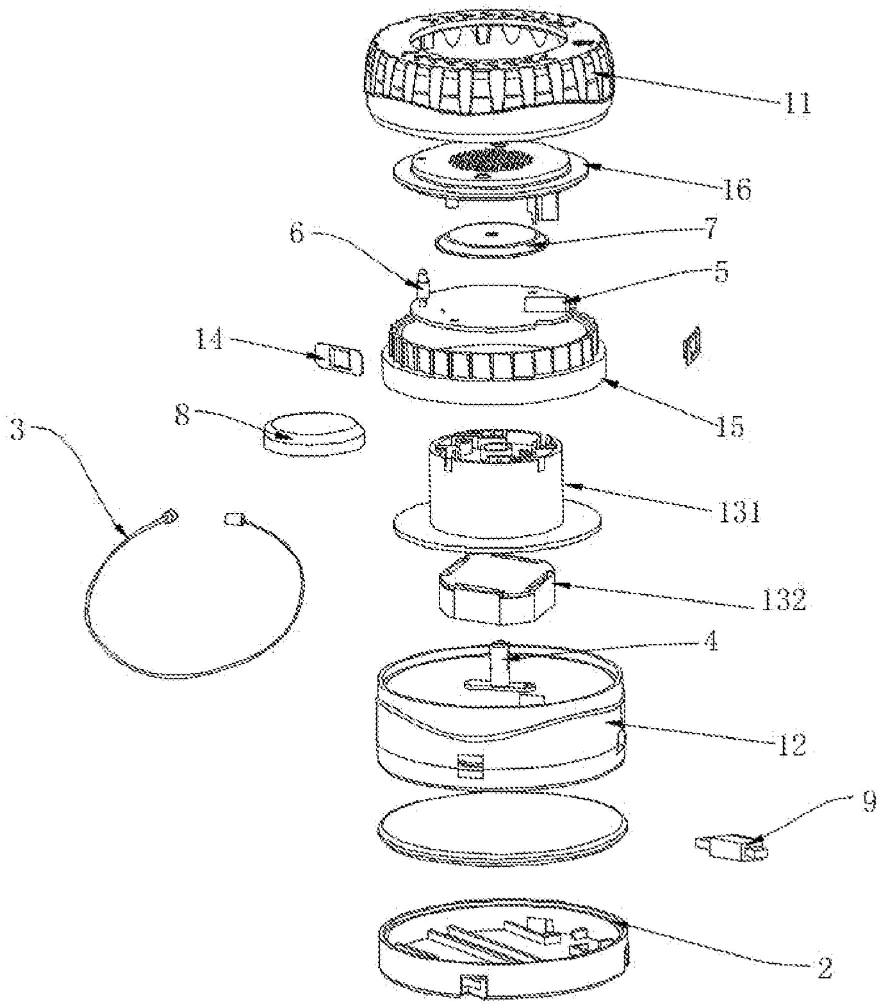
FIG. 3 is an exploded view of the novel spider electronic tag according to the present application.
Figure 4:
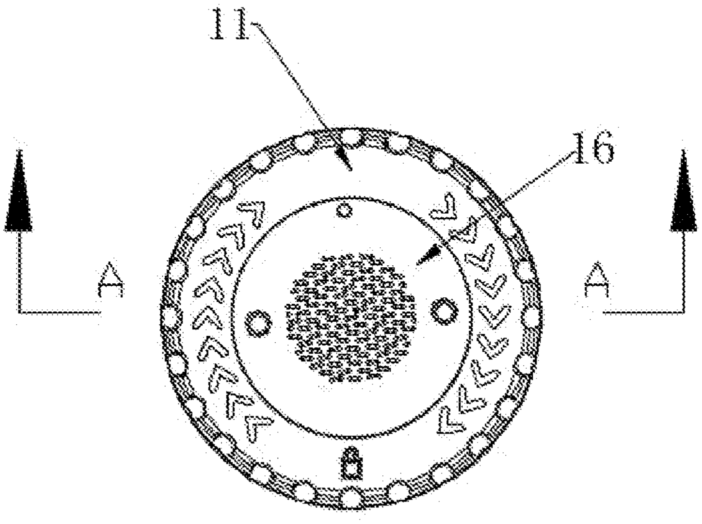
FIG. 4 is a top view of the novel spider electronic tag according to the present application.
Figure 5:
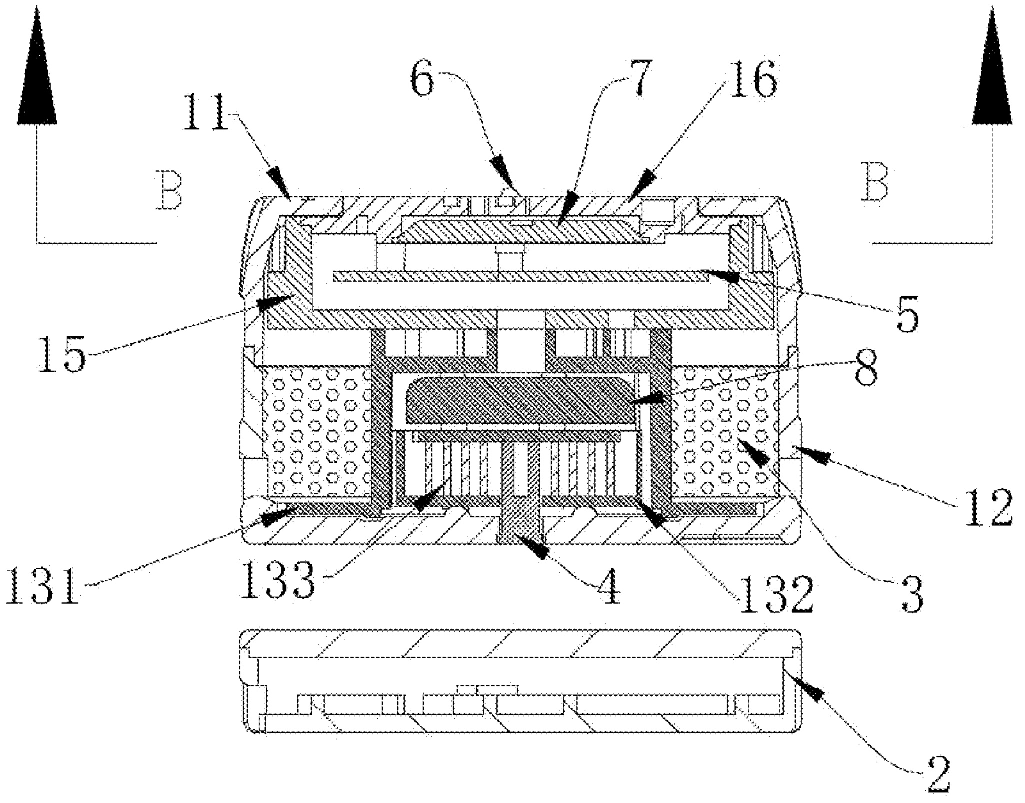
FIG. 5 is a cross-sectional view taken along line A-A in FIG. 4.

Further, in this embodiment, as shown in FIG. 2 and FIG. 5, the take-up assembly 13 includes a take-up reel 131, a coil spring storage box 132 and a coil spring 133.

The take-up reel 131 is mounted at the bottom of the rotating ratchet member 15 by welding or other fixing methods, and a mounting groove is defined at the bottom of the take-up reel 131; the coil spring storage box 132 is embedded in the mounting groove, the coil spring 133 is accommodated in the coil spring storage box 132, and a through hole coaxial with the coil spring 133 is defined at the bottom of the coil spring storage box 132. The middle of the coil spring 133 is positioned and clamped with the central positioning column 4, so as to realize the positioning and mounting of the rotating ratchet member 15 and the take-up assembly 13.

When the tag is unlocked and the article is taken out, the coil spring 133 drives the rotating ratchet member 15 and the take-up reel 131 to rotate synchronously to retract the steel wire rope 3 into the housing, realizing automatic retracting of the steel wire rope and improving the work efficiency of the user.

In addition, in the production process, in order to meet the torque requirements of coil springs 133 of different specifications, the central positioning column 4 and the lower housing 12 are separately arranged in this embodiment, and the central positioning column 4 is fixed to the lower housing 12 by bolts, so that the mounting angle of the central positioning column 4 can be changed as required during the production process, so as provide different torque forces of the coil spring 133.

Specifically, in this embodiment, as shown in FIG. 2 and FIG. 5, a groove is defined in the middle of the rotating ratchet member 15, and a top cover 16 is buckled at the opening of the groove; a through hole is defined in the middle of a top wall of the upper housing 11, and the top cover 16 is rotatably embedded in the through hole.

A circuit board 5 is fixedly mounted in the groove by bolts, a light guide column 6 which is electrically connected to the circuit board 5 is mounted on a surface of the circuit board 5, and the light guide column 6 extends out of the top cover 16; further, a buzzer 7 is embedded in the top cover 16, and the buzzer 7 is electrically connected to the circuit board 5 through a wire (not shown); the circuit board 5, the light guide column 6 and the buzzer 7 form an alarm assembly.

In addition, a rope-passing hole for the steel wire rope 3 to pass through is respectively defined at the bottom of the groove, at the take-up reel 131, at the coil spring storage box 132, at the bottom of the lower housing 12 and at the bottom of the base 2; one end of the steel wire rope 3 is fixed at the bottom of the groove by a copper knob, and the other end is passed in a listed sequence through the rotating ratchet member 15, the take-up reel 131, the coil spring storage box 132, the lower housing 12 and the base 2 clockwise from top to bottom, and then is fixed at the bottom of the groove by another copper knob; the copper knobs at the two ends of the steel wire rope 3 abut against the circuit board 5 to form a closed circuit; a battery 8 is mounted inside the take-up reel 131, and a conductive column is mounted at the rope-passing hole of the take-up reel 131; the battery 8 is electrically connected to the circuit board 5 through the take-up reel 131, the conductive column (not shown), the steel wire rope 3 and the copper knobs to supply power, which pertains to the prior art and will not be described in detail herein.

When the steel wire rope 3 is cut for commodity stealing, the closed circuit is disconnected, a control chip in the circuit board 5 starts the alarm program, the light guide column 6 flashes continuously, and the buzzer 7 issues an alarm to notify the staff, which pertains to the prior art and will not be described in detail herein.

In addition, a radio frequency sensor 9 is further mounted in the base 2. When the thief steals the commodity integrated with the electronic tag, the radio frequency sensor 9 will be sensed when passing through an antenna door at an exit of a shopping mall, and an alarm will be issued, thus further improving the anti-theft performance, which pertains to the prior art and will not be described in detail herein.

The standard parts used in the present application can be purchased from the market, and the special-shaped parts can be customized according to the description and the accompanying drawings. The specific connection methods of all parts are the conventional methods such as bolts, rivets, and welding, which are mature in the prior art. The machinery, parts and equipment are all the conventional models in the prior art. In addition, the conventional connection methods are used in the circuit connection in the present application, which will not be described in detail herein. The contents not described in detail in this specification belong to the prior art known to those skilled in the art.

It is obvious for the person skilled in the art to make various modifications to these embodiments. The general principle defined herein may be applied to other embodiments without departing from the spirit or scope of the present application.

What is claimed is:

1. A novel spider electronic tag, comprising a take-up device; and a base connected to the take-up device through a retractable steel wire rope; wherein the take-up device comprises:

a housing;

a take-up assembly, mounted in the housing; and a locking fastener, mounted in the housing and configured to lock the take-up assembly;

wherein the locking fastener comprises:

a rotating ratchet member, fixedly arranged at a top of the take-up assembly; and a leaf spring, embedded in an inner circumferential wall of the housing and configured to cooperate with the rotating ratchet member to lock the take-up assembly;

wherein the take-up assembly comprises:

a take-up reel, fixed at a bottom of the rotating ratchet member, wherein a mounting groove is defined at a bottom of the take-up reel; and a coil spring, embedded in the mounting groove, wherein a middle of the coil spring is positioned and clamped with a central positioning column at a bottom of the housing, to drive the take-up reel and the rotating ratchet member to rotate synchronously to retract or release the steel wire rope.

2. The novel spider electronic tag according to claim 1, wherein at least one leaf spring is provided.

3. The novel spider electronic tag according to claim 1, wherein a coil spring storage box is embedded in the mounting groove, the coil spring is accommodated in the coil spring storage box, and a through hole coaxial with the coil spring is defined at a bottom of the coil spring storage box.

4. The novel spider electronic tag according to claim 1, wherein the central positioning column is detachably connected with the housing.

5. The novel spider electronic tag according to claim 3, wherein a rope-passing hole for the steel wire rope to pass through is respectively defined at the bottom of the rotating ratchet member, at the take-up reel, at the coil spring storage box, at the bottom of the housing and at a bottom of the base.

* * * * *